(12) United States Patent
Ma

(10) Patent No.: US 10,057,455 B2
(45) Date of Patent: Aug. 21, 2018

(54) METHOD AND SYSTEM FOR PRINTING-DEVICE MONITORING, AND PRINTING MONITORING SERVER

(71) Applicant: Zhuhai Seine Technology CO., Ltd., Zhuhai (CN)

(72) Inventor: Zhenyu Ma, Zhuhai (CN)

(73) Assignee: ZHUHAI SEINE TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 15/433,000

(22) Filed: Feb. 15, 2017

(65) Prior Publication Data

US 2017/0163843 A1 Jun. 8, 2017

Related U.S. Application Data

(63) Continuation of application No. PCT/CN2015/087992, filed on Aug. 25, 2015.

(30) Foreign Application Priority Data

Sep. 1, 2014 (CN) .......................... 2014 1 0441446

(51) Int. Cl.
*H04N 1/00* (2006.01)
*H04N 1/32* (2006.01)

(52) U.S. Cl.
CPC ..... *H04N 1/32534* (2013.01); *H04N 1/00042* (2013.01); *H04N 1/00204* (2013.01);
(Continued)

(58) Field of Classification Search
USPC ....................................................... 358/1.16
See application file for complete search history.

(56) References Cited

U.S. PATENT DOCUMENTS 8,223,365 B2 7/2012 Scaff
2004/0059800 A1* 3/2004 Hanson .................. H04L 67/34
709/220
(Continued)

FOREIGN PATENT DOCUMENTS

CN 1708749 A 12/2005
CN 104270545 A 1/2015
(Continued)

OTHER PUBLICATIONS

The World Intellectual Property Organization (WIPO) International Search Report for PCT/CN2015/087992 dated Nov. 25, 2015 5 Pages.
(Continued)

*Primary Examiner* — Neil R McLean
*Assistant Examiner* — Darryl V Dottin
(74) *Attorney, Agent, or Firm* — Anova Law Group, PLLC

(57) ABSTRACT

The present disclosure provides a method for printing-device monitoring by a printing monitoring server connected to a network, including: receiving identification information of a non-networked printing device and identification information of a host computer sent by the host computer, the non-networked printing device being connected to the host computer and being connected to the network through the host computer; when locally-stored printing device data contains the identification information of the non-networked printing device, determining host-computer identification information corresponding to the non-networked printing device and contained in the printing device data, to be identification information of a previous host computer; and when the identification information of the previous host computer is inconsistent with the identification information of the host computer, commanding the previous host com-
(Continued)

puter stored with the identification information of the non-networked printing device to delete the identification information of the non-networked printing device.

18 Claims, 9 Drawing Sheets

(52) U.S. Cl.
CPC ..... *H04N 1/00323* (2013.01); *H04N 1/00344* (2013.01); *H04N 1/32122* (2013.01); *H04N 1/32539* (2013.01); *H04N 2201/3205* (2013.01)

(56) References Cited

U.S. PATENT DOCUMENTS

| | | | |
|---|---|---|---|
| 2005/0097198 A1* | 5/2005 | Getler | H04N 1/00233 709/223 |
| 2005/0262321 A1* | 11/2005 | Iino | G06F 21/10 711/164 |
| 2008/0312944 A1* | 12/2008 | Scaff | G06Q 10/06 705/1.1 |
| 2009/0039147 A1* | 2/2009 | Yamamoto | G06F 21/608 235/375 |
| 2013/0201519 A1 | 8/2013 | Duyk | |

FOREIGN PATENT DOCUMENTS

| | | |
|---|---|---|
| EP | 1868077 A2 | 12/2007 |
| JP | 2008046895 A | 2/2008 |
| WO | 2013116703 A1 | 8/2013 |

OTHER PUBLICATIONS

China Intellectual Property Organization (SIPO) Search Report for 2014104414468 1 Page The European Patent Office (EPO).

\* cited by examiner

METHOD AND SYSTEM FOR PRINTING-DEVICE MONITORING, AND PRINTING MONITORING SERVER

CROSS-REFERENCES TO RELATED APPLICATIONS

This application is a continuation application of PCT Patent Application No. PCT/CN2015/087992, filed on Aug. 25, 2015, which claims priority to Chinese Patent Application No. 201410441446.8, filed with the State Intellectual Property Office of the People's Republic of China (SIPO) on Sep. 1, 2014, the entire contents of both of which are incorporated herein by reference.

FIELD OF THE DISCLOSURE

The present disclosure generally relates to the field of printing technology and, more particularly, relates to a method and system for printing-device monitoring, and a printing monitoring server.

BACKGROUND

In current printer applications, with the growing popularity of internet printing, more and more files are transmitted to printers through networks to be printed out. Meanwhile, it is also required that the printers can be monitored and managed by the printing monitoring servers (e.g., managed print services, MPS) in the networks. Through the internet monitoring of printing monitoring servers, the usage status of a printer can be obtained in real-time. For example, status information, such as the number of printed pages, the remaining amount of toner or ink, supply information of the paper for printing, occurred error messages, etc., needs to be timely monitored for the printer to be maintained in time.

Especially, for companies and government agencies that have a high demand of printing, they all expect having proper management of the printers that are for internal use. Particularly, they expect timely supply and managing of orders of printing consumables such as paper for printing, toner, ink, and etc. Printing monitoring servers can perform unified management for all printers connected to the internal network of a company through network monitoring protocols (e.g., simple network management protocol, SNMP).

However, some printers that are not directly connected to a network (i.e., non-networked printers) only support interfaces such as universal serial bus (USB), serial interfaces (e.g., RS323 and RS 485), or parallel interfaces, and are connected to computers through these interfaces. The printers do not support network monitoring protocols. In addition, in some special occasions (e.g., enterprise sectors with relatively high security requirements and state authorities), or under the condition to control the cost of printers, printing monitoring servers are not able to manage these printers that are not connected to networks.

Meanwhile, the above-mentioned printers that are not directly connected to networks have advantages such as simple structures, simple functions, and being easy to use, and are thus used by a great number of users currently. Especially for those users who are not familiar with printers, they are more likely to choose printers with simple operations and are easy to use when selecting printers. Thus, the managing and monitoring of these printers that are not connected to networks is necessary.

In view of the above problems, US Patent Publication No. US20050097198 provides a solution in which the network function on a host computer, being locally connected to a non-networked printer, is used as a transit bridge to transmit the information to be monitored, of the non-networked printer, to the monitoring device in the network through non-networked communication means such as USB. This solution solves some issues regarding monitoring non-networked printing devices.

However, according to the present disclosure, many non-networked printing devices are mobile, that is, many non-networked printing devices can be moved from one host computer to another host computer and connected to that host computer. Existing printing monitoring servers do not have suitable mechanism to monitor such changes, causing the printing monitoring servers to possibly send monitoring commands to a wrong host computer, or even causing the printing monitoring servers to lose accurate monitoring of the non-networked printers that have been moved and changed connection to the host computer.

The disclosed methods and systems are directed to solve one or more problems set forth above and other problems in the art.

BRIEF SUMMARY OF THE DISCLOSURE

One of the technical problems to be solved by the present disclosure is to overcome the defect that the existing printing monitoring servers lacking the ability to monitor a non-networked printer after changing the host computer.

One aspect of the present disclosure provides a method for printing-device monitoring by a printing monitoring server connected to a network, including: receiving identification information of a non-networked printing device and identification information of a host computer sent by the host computer, the non-networked printing device being connected to the host computer and being connected to the network through the host computer; when locally-stored printing device data contains the identification information of the non-networked printing device, determining host-computer identification information corresponding to the non-networked printing device and contained in the printing device data, to be identification information of a previous host computer; and when the identification information of the previous host computer is inconsistent with the identification information of the host computer, based on the identification information of the previous host computer, commanding the previous host computer stored with the identification information of the non-networked printing device to delete the identification information of the non-networked printing device, and updating the non-networked printing device to be corresponding to the host computer in the printing device data based on the identification information of the non-networked printing device and the identification information of the host computer.

Another aspect of the present disclosure provides a printing monitoring server, capable of being connected to a network, including: a receiving module, configured to receive identification information of a non-networked printing device and identification information of a host computer sent by the host computer, the non-networked printing device being connected to the host computer and being connected to the network through the host computer; a determining module, configured to, when locally-stored printing device data contains the identification information of the non-networked printing device, determine a host-computer identification information corresponding to the non-networked printing device and contained in the printing device data, to be identification information of a previous host computer; and an executing module, configured to, when the identification information of the previous host computer is inconsistent with the identification information of the host computer, based on the identification information of the previous host computer, command the previous host computer stored with the identification information of the non-networked printing device to delete the identification information of the non-networked printing device, and update the non-networked printing device to be corresponding to the host computer in the printing device data based on the identification information of the non-networked printing device and the identification information of the host computer.

Another aspect of the present disclosure provides a host computer, capable of being connected to a networking, including a server network communication unit, a printing device communication control unit, a command parsing unit, a LAN monitoring unit, and a deleting unit. The server network communication unit is configured to facilitate communication between the command parsing unit and a printing monitoring server in the network; the printing device communication control unit is configured to facilitate communication between the LAN control unit and a non-networked printing device connected to the host computer a command parsing unit is configured to package and convert an execution command sent by the printing monitoring server to a command recognizable to the non-networked printing device and forward the command to the LAN monitoring unit, receive a response for the command sent by the non-networked printing device, and send the response to the printing monitoring server after packaging the response; the LAN monitoring unit is configured to send the command to the non-networked printing device and send the response to the command parsing unit; and the deleting unit is configured to receive a deletion command sent by the printing monitoring server, and delete locally-stored device information of a non-networked printing device previous connected to the host computer, wherein the printing monitoring server sends the deletion command when the non-networked printing device previous connected to the host computer interacts with the printing monitoring server through another host computer.

BRIEF DESCRIPTION OF THE DRAWINGS

The drawings provide further understanding of the present disclosure, and are a part of the specification. The drawings and the embodiments of the present disclosure are used to explain the present disclosure and are not construed as limiting the scope of the present disclosure.

DETAILED DESCRIPTION

Embodiments of the present disclosure will now be described in detail with reference to the accompanying drawings. Thus, solving the technical problems using the technical means provided by the present disclosure, and the realizing of the technical effect can be understood and implemented. It is to be noted that, each embodiment of the present disclosure and each feature in the embodiments may be combined with one another so long as they do not constitute a conflict, and the technical solution is within the scope of the present disclosure.

In addition, the steps illustrated in the flow charts of the drawings may be performed in, e.g., a computer system having a set of computer-executable instructions. Also, although the logical order is shown in the flow charts, in some cases, the steps shown or described can be performed in a different order.

In the disclosed embodiments, a host computer, connected to a network, is used to control a non-networked printing device that is connected to the network through the host computer, and the host computer is used to monitor the non-networked printing device. The host computer is used to transmit the monitoring information to the printing monitoring server. Embodiments of the present disclosure may detect the changes on host computer connected to the non-networked printing device, and ensure the printing monitoring server in the network can accurately monitor the non-networked printing device.

Figure 1:
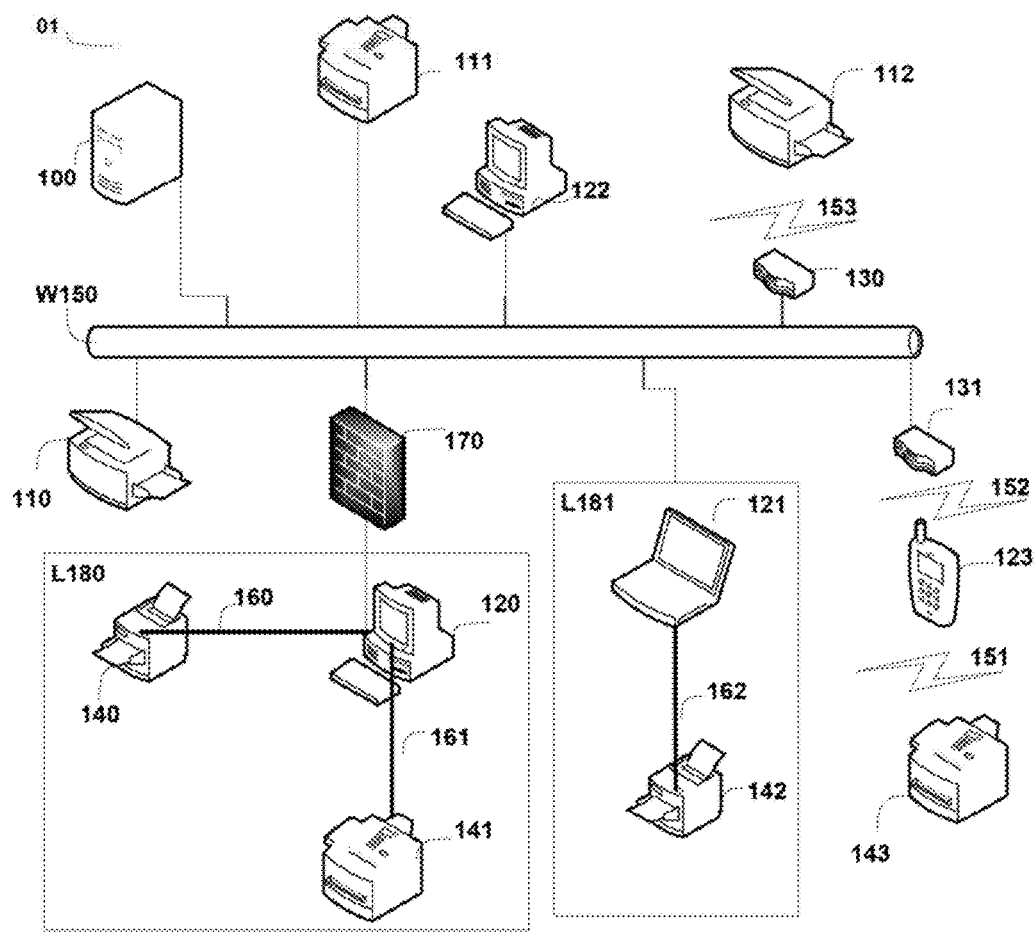
FIG. 1 illustrates an exemplary printing network system consistent with various disclosed embodiments of the present disclosure.

As shown in FIG. 1, a printing network system 01 may be located in a network W150. The network W150 may be a public network, or may be an internal local area network, and so on. The printing network system 01 may include a printing monitoring server 100, networked printing devices (110, 111, and 112), computers (or host computers, 120, 121, 122, and 123), routers (130 and 131), non-networked printing device (140, 141, 142, and 143), and so on. The devices may communicate with one another via network W150.

The printing monitoring server 100 may monitor the printing devices in the network, such as the networked printing devices 110, 111, and 112 in FIG. 1, through network monitoring protocols (e.g., SNMP). Meanwhile, through the host computers, the printing monitoring server 100 may monitor the non-networked printing device 140, 141, 142, and 143.

In the disclosed embodiments, the networked printing devices may include the printing devices (e.g., the networked printing device 110) connected to the network W150 directly through a network interface card (e.g., NIC), and may also include printing device connected to the network W150 through a wireless network interface. For example, the networked printing device 112 may communicate with the router 130 through a wireless network interface mode 153 (e.g., IEEE standard 802.11b). The router 130 may be used as a relay to connect networked printing device 112 to the network W150 and the networked printing device 112 may communicate with other devices in network W150.

In the disclosed embodiments, a non-networked printing device may be connected to a host computer directly through wired connection or wireless connection, and may be connected to network W150 through the host computer. The host computer may establish direct connection to the non-networked printing device through wired connection or wireless connection (point-to-point) using any one of a USB, a serial interface, a parallel interface, wireless fidelity (WiFi) connection, Bluetooth, Zigbee (wireless personal area network), and infrared. The host computer may be mobile device such as a general-purpose computer device shown as the computer 122 in FIG. 1, or a mobile phone, a laptop computer, a tablet computer, and a personal digital assistant (PAD). For example, the host computer may be the mobile phone 123 and the laptop computer 121, and so on, in FIG. 1. The non-networked printing device 143 may communicate with the mobile phone 123 through point-to-point wireless connection 151 (e.g., Bluetooth). The mobile phone 123 may be connected to network W150 through a wireless interface mode 152 (e.g., IEEE 802.11b) using the router 131 as relay.

It should be noted that, a host computer may be simultaneously connected to a plurality of non-networked printing devices, e.g., the host computer 120 in FIG. 1 may be simultaneously connected to two non-networked printing devices 140 and 141. Thus, several devices may be connected to form a small local area network L180, and may be connected to network W150 through a firewall 170. In addition, a networked printing device may also be connected to a host computer through a local interface.

In the printing network system 01, to monitor non-networked printing devices, each host computer locally connected to a non-networked printing device in the network W150 may be used as a transit bridge. A host computer may obtain the status information of a non-networked printing device, and send the obtained status information of the non-networked printing device to the printing monitoring server 100 through network W150.

As shown in FIG. 1, the host computer 120 may be locally connected with the non-networked printing devices 140 and 141 through wired cables (e.g., USB cables) 160 and 161. The host computer 120 may obtain the device information of the non-networked printing devices 140 and 141 from the non-networked printing devices 140 and 141 through the wired cables 160 and 161, and may send the obtained device information of the non-networked printing devices 140 and 141 and the identification of the host computer 120 to the printing monitoring server 100 through network W150.

The non-networked printing device 143 may be connected to the mobile phone 123 through a wireless interface 151 (e.g., Bluetooth). The mobile phone 123 may obtain the device information of the non-networked printing device 143 through the wireless interface 151, and may send the obtained device information and the identification of the mobile phone 123 to the printing monitoring server 100 of network W150 through the relay of the wireless router 131.

Networked printing devices 110, 111, and 112 may not need host computers to transfer their device information, and may directly send their device information to the printing monitoring server 100 through network W150.

Figure 2:
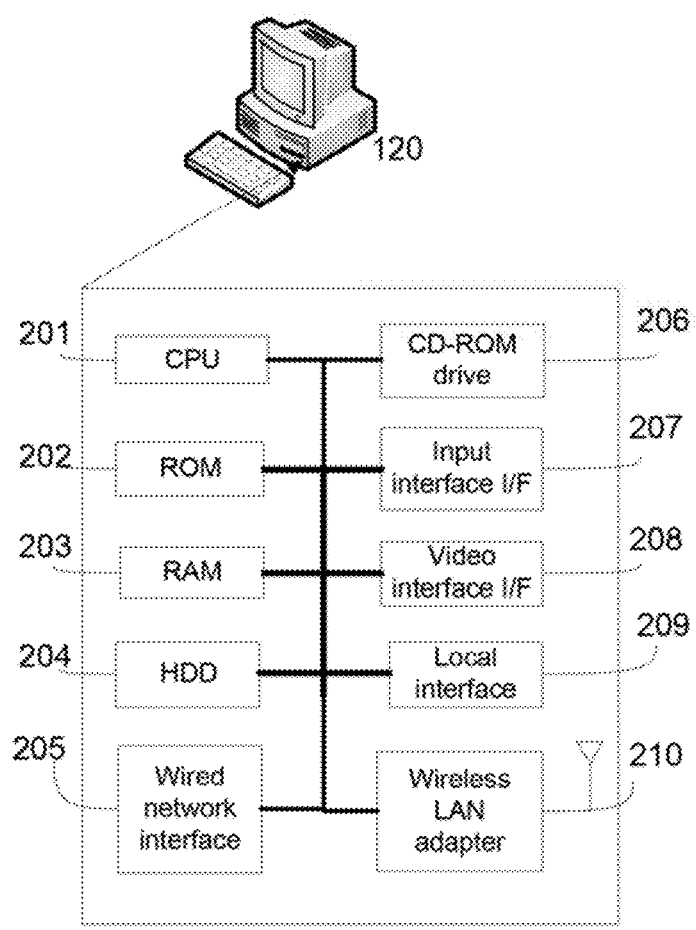
FIG. 2 illustrates an exemplary host computer consistent with various disclosed embodiments of the present disclosure.

Host computer 120 may be used as an example. FIG. 2 illustrates an exemplary host computer 120.

As shown in FIG. 2, the host computer 120 may include a central processing unit (CPU) 201, a read only memory (ROM) 202, a random access memory (RAM) 203, a hard disk drive (HDD) 204, a compact disc read-only memory (CD-ROM) drive 206, an input interface (I/F) 207, a video interface (I/F) 208, a local interface 209, a wired network interface 205, and a wireless LAN adapter 210 (i.e., wireless LAN card).

CPU 201 may mainly control various functions of the host computer 120. ROM 202 may mainly be used for storing various programs, such as the basic input/out system (BIOS) executed by the CPU 201 when the host computer 120 is starting. RAM 203 may mainly be used as the work memory of the CPU 201. HDD 204 may mainly be used to store various files including the files of the operating system. CD-ROM drive 206 may mainly be used to read data from a CD (compact disc). Input interface (I/F) 207 may mainly be configured to input the input signals from the key pad or mouse (not shown) of the host computer 120 to the CPU 201. Video interface (I/F) 208 may mainly be configured to display information on the monitor of the host computer 120 under the control of the CPU 201. Wired network interface 205, such as Ethernet (Trademark), may mainly be configured to connect the host computer 120 to network W150 through a wired cable connecting to a Access Point or a router. Wireless LAN adapter 210 may mainly be configured to connect the host computer 120 to an external device through wireless connection according to wireless communication standards (e.g., IEEE802.11). The host computer 120 may be connected to a peripheral device, e.g., a non-networked printing device, through the local interface 209. The parts may be connected to one another through the bus line.

Figure 3:
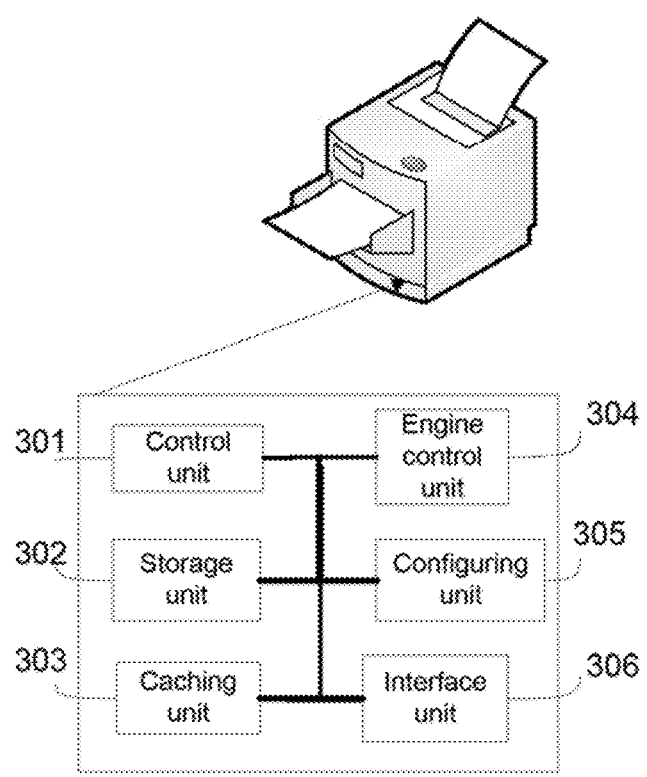
FIG. 3 illustrates an exemplary printing device consistent with various disclosed embodiments of the present disclosure.

FIG. 3 illustrates an exemplary printing device and the hardware block diagram.

As shown in FIG. 3, the printing device may mainly include a control unit 301, a storage unit 302, a caching unit 303, an engine control unit 304, a configuring unit 305, and an interface unit 306, etc.

The control unit 301 (e.g., CPU) may mainly control various operations of the printing device. The storage unit 302 (e.g., ROM) may mainly store various operating programs, e.g., the processing program when the control unit 301 is starting printing. The caching unit 303 (e.g., RAM and Flash) may mainly be used as a working storage for the control unit 301. The engine control unit 304 may mainly be configured to control the printing operations of the printing device, e.g., control printing transfer and photographic fixing, and so on. The configuring unit 305 may mainly be used to receive the commands inputted by the user. The interface unit 306, including a local interface, a wired network interface, and a wireless LAN adapter, may be used to connect to the host computer. The local interface, including the abovementioned USB interfaces, serial interfaces, etc., and the wired network interface such as Ethernet (Trademark), may be configured as connecting to Access points or routers by wired cables, so that the printing devices may be connected to network W150. Wireless LAN adapter may mainly be configured to be in accordance with wireless communication standards (e.g., IEEE802.11) to enable communication between the printing devices and external devices. The abovementioned parts may be connected to one another through the bus line.

The interface unit 306 of a non-networked printing device often only includes a local interface.

In the present disclosure, the interface unit 306 of a networked printing device, besides a local interface, may further include one or more of a network interface and a wireless LAN adapter. The user may choose to connect the networked printing device, as a local device, to the host computer through the local interface or the wireless LAN adapter, so that the networked printing device can be used. The user may also choose to connect the networked printing device, to the network through the network interface or the wireless LAN adapter.

In addition, the printing device of the present disclosure may not be limited to the description of the embodiment. The printing device may also include other image processing devices, e.g., a scanner, a copy machine, a fax machine, and a Multi-function Printer (MFP) that includes functions of printing, copying, scanning, and faxing, etc.

Figure 4:
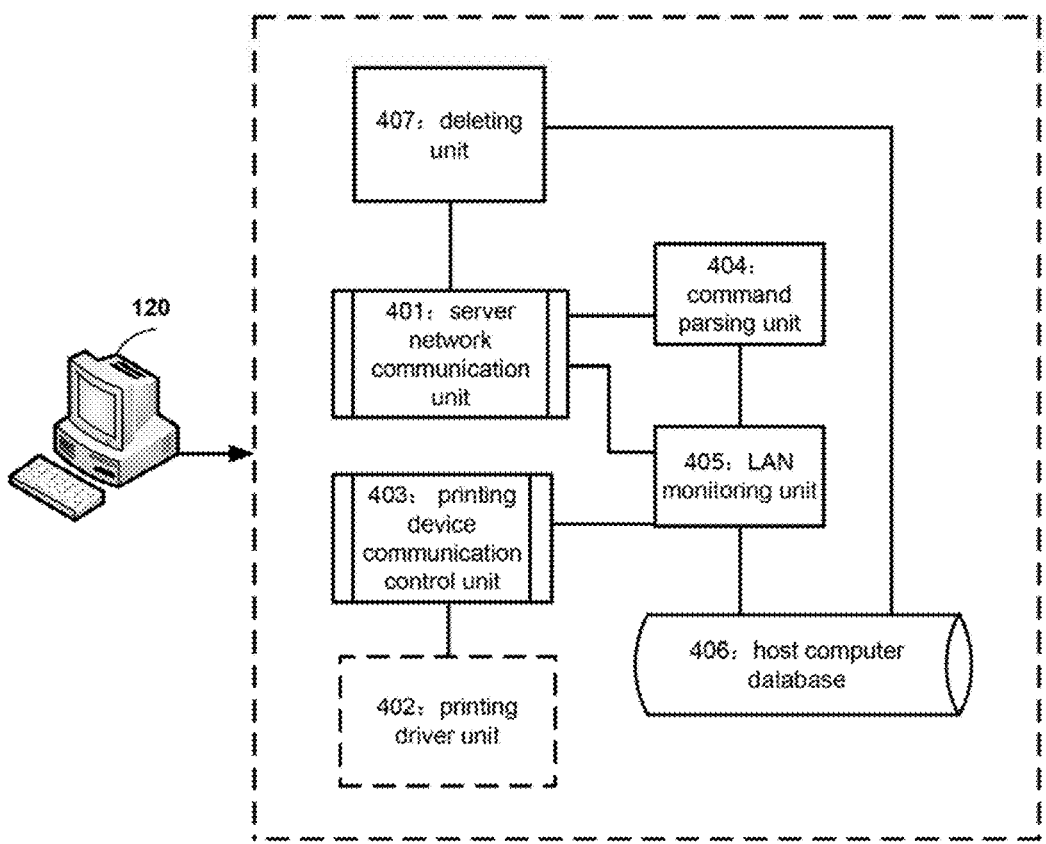
FIG. 4 illustrates an exemplary functional module of a printing monitoring module in a host computer consistent with various disclosed embodiments of the present disclosure.

As shown in FIG. 4, to realize network monitoring of a non-networked printing device, in the present disclosure, the host computer 120 connected to the non-networked printing device may be configured to include a printing monitoring module 400.

In the present disclosure, the printing monitoring module 400 may include: a server network communication unit 401, a printing driver unit 402, a printing device communication control unit 403, a command parsing unit 404, a LAN monitoring unit 405, a host computer database 406, and a deleting unit 407.

The server network communication unit 401 may mainly be used to implement the communication between the command parsing unit 404 and the printing monitoring server 100. The communication protocols used between the command parsing unit 404 and the printing monitoring server 100 may be consistent with the monitoring protocols used between the printing monitoring server 100 and the networked printing devices in the entire network W150. For example, the communication protocols may be SNMP, hyper text transport protocol (HTTP), transmission control protocol/internet protocol (TCP/IP), file transfer protocol (FTP), or simple message transfer protocol (SMTP), etc.

The printing driver unit 402 may be connected with the printing device communication control unit 403, similar to an ordinary driving program, and may be used to generate printing data suitable for a non-networked printing device to process. The printing driver unit 402 may send the printing data to the non-networked printing device. In other embodiments of the present disclosure, the printing driver unit 402 may also be a separate part from the printing monitoring module 400.

The printing device communication control unit 403 may be connected with the LAN monitoring unit 405, mainly to facilitate the communication between the LAN monitoring unit 405 and a non-networked printing device. Commonly used communication methods may include wired connection methods such as USB, serial interfaces, and parallel interfaces, or wireless connection methods such as Bluetooth, and WiFi direct connection.

The command parsing unit 404, connected to the server network communication unit 401, may mainly be used to receive an execution command (e.g., various commands or inquiries) from the printing monitoring server 100, forwarded by the server network communication unit 401. The command parsing unit 404 may package and convert the execution command into a command recognizable to a non-networked printing device and send the execution command, packaged and converted, to the non-networked printing device through the LAN monitoring unit 405 and the printing device communication control unit 403. The command parsing unit 404 may receive the response to the execution command, sent by the non-networked printing device and through the printing device communication control unit 403 and the LAN monitoring unit 405, and may package the response to a format of the communication protocol applied in network W150 and send the formatted response to the printing monitoring server 100.

The LAN monitoring unit 405, connected to the printing device communication control unit 403 and the command parsing unit 404, may be used to monitor the interface of the non-networked printing device to the host computer, manage the interface of the non-networked printing device to the host computer, and monitor changes such as the change of IP address. The LAN monitoring unit 405 may forward the command, the command parsing unit 404 sends to the non-networked printing device, to the printing device communication control unit 403. The printing device communication control unit 403 may send the command to the non-networked printing device, receive the response of the non-networked printing device to the command, and send the response to the command parsing unit 404.

The LAN monitoring unit 405, connected to the host computer database 406, may send a status request command to the non-networked printing device through the printing device communication control unit 403, and receive the status information returned by the non-networked printing device based on the status request command. The LAN monitoring unit 405 may, at the same time, generate the identification information (e.g., the host computer name, the IP address, etc.) of the current host computer, combine the status information of the non-networked printing device with the identification information of the non-networked printing device to form a portion of the device information and store the portion of the device information in the host computer database 406. The LAN monitoring unit 405 may also send the device information of the non-networked printing device and the identification information of the current host computer, stored in the host computer database 406, to the printing monitoring server 100 through the server network communication unit 401.

The LAN monitoring unit 405 may transfer the commands or inquiries processed by the command parsing unit 404 to the non-networked printing device through the printing device communication control unit 403. Meanwhile, the result returned by the non-networked printing device may be packaged by the command parsing unit 404 into the format according to the communication protocol applied in network W150, and the formatted result may be sent to the printing monitoring server 100.

The host computer database 406 may be used to store the device information of the non-networked printing device connected to the current host computer. For example, in LAN L180, the host computer database 406 of the host computer 120 may store the device information of the non-networked printing devices 140 and 141. The information may include the manufacture and product information of the non-networked printing devices, the serial numbers of the non-networked printing devices, the status information of the non-networked printing devices, online tagging of the non-networked printing devices representing whether the non-networked printing devices are online (i.e., the non-networked printing devices being connected to the host computers, having the power supply on, and being ready to use). The host computer database 406 may also store the identification information of the host computer 120, e.g., interface numbers of the non-networked printing devices 140 and 141 on the host computer 102, the host computer name, and the address of the host computer, etc. The device information and the identification information of the host computer may be kept consistent with the correspondence relation data of the non-networked printing devices, stored in the server database 500 which is connected to (or installed in) the printing monitoring server 100 and used for storing the printing device data.

The deleting unit 407, connected to the server network communication unit 401 and the host computer database 406, may be configured to receive a deletion command sent from the printing monitoring server, and may delete the identification information of previously connected non-networked printing device that is stored in the host computer database 406. The printing monitoring server may send the deletion command, when a non-networked printing device, previously connected to the host computer, interacts with the printing monitoring server through another host computer.

In the embodiments of the present disclosure, the printing monitoring module 400 may also not include the printing driver unit 402. The printing driver unit 402 may be configured to form a component of the printing driver of a printing device. The printing driver may generate printing data and monitor printing devices at the same time. In addition, the command parsing unit 404, the LAN monitoring unit 405, and the deleting unit 407 may be integrated to form a unit. The unit may execute the functions of each of the command parsing unit 404, the LAN monitoring unit 405, and the deleting unit 407.

Figure 5:
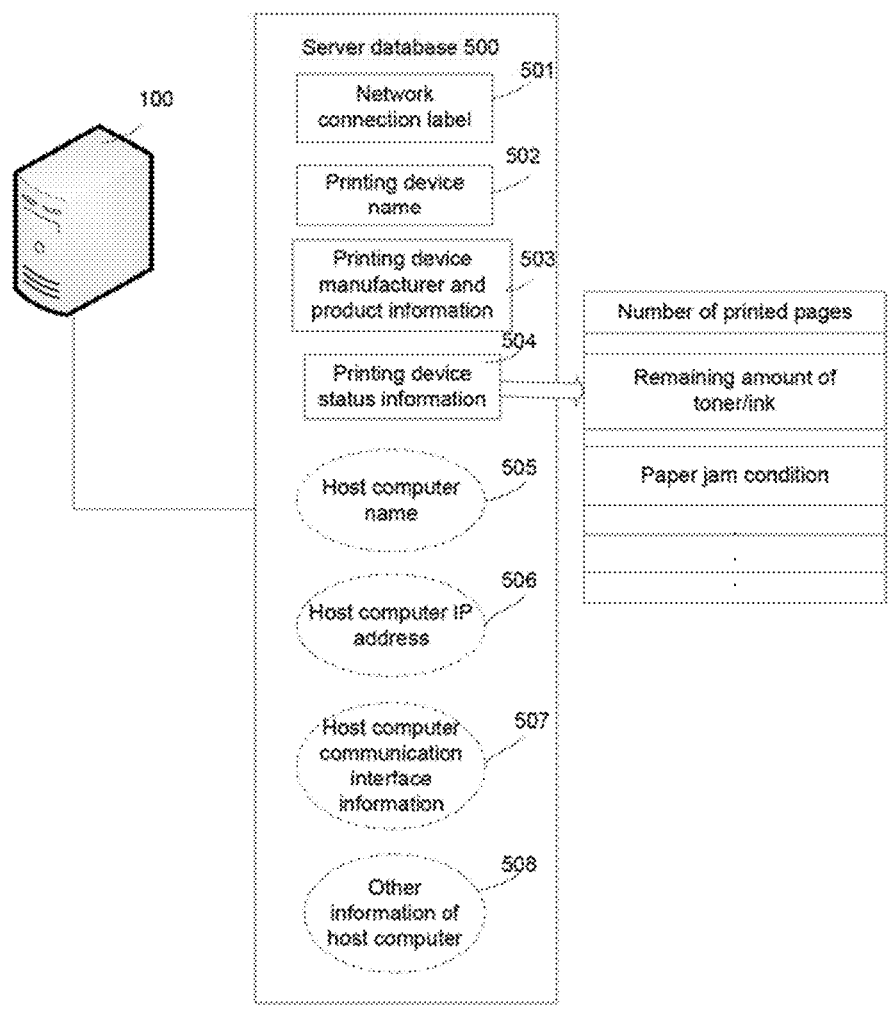
FIG. 5 illustrates exemplary storage content of a database in an exemplary server consistent with various disclosed embodiments of the present disclosure.

As shown in FIG. 5, the printing monitoring server 100 may be a general-purpose computer, e.g., a work station, a personal computer, or a server. The printing monitoring server 100 may be configured with a managing module (not shown in FIG. 5), which is connected to a server database 500 used for storing printing device data. The printing device data may include printed task records, the correspondence relation data representing the correspondence relation between the non-networked printing devices and the host computers connected to the non-networked printing devices, and the network connection labels 501, etc.

The correspondence relation data may represent the correspondence relation between the device information of the non-networked printing devices and the identification information of the host computers connected to the non-networked printing devices. The device information of a non-networked printing device may mainly include at least one of the printing device name 502, the printing device manufacturer and product information 503, and the printing device status information 504. The identification information of a host computer may include at least one of the host computer name 505, the host computer IP address 506, the host computer communication interface information 507, and other information 508 of the host computer.

The printing device name 502 may include the device serial number of the printing device. The network connection label 501 may be used to identify whether the printing device is a networked printing device or a non-networked printing device. The printing device manufacturer and product information 503 may be consistent with the printing device manufacturer and product information stored in the host computer database 406. The printing device name 502 and the printing device manufacturer and product information 503 may be used as the identification information to identify a printing device. The printing device manufacturer and product information 503 may include the printing device brand name, the product model, the interface information of the printing device on the host computer (e.g., the PID (product identification code, product ID) and VID (vendor identification code, vendor ID) of the USB of the non-networked printing device). The host computer name 505, the host computer IP address 506, the host computer communication interface information 507, and other information 508 of the host computer may be generally referred to as the identification information of the host computer, to identify the host computer connected with the current non-networked printing device. The printing device status information 504 may represent the status information of the printing device such as the number of printed pages, remaining amount of toner/ink, and paper jam condition.

The managing module configured on the printing monitoring server 100 may store the device information of the non-networked printing device, obtained through the printing monitoring module 400, on the server database 500. Common managing modules of the printing monitoring server, such as MPS, may perform necessary adjustment and overall optimization of the deployment on the device being monitored, and may be fully in charge of the operation, supply replacement, and maintenance of the device being monitored, etc.

For a non-networked printing device, the correspondence relation data, representing the correspondence relation between the non-networked printing device and the host computer and stored in the server database 500, may specifically include the device information of the non-networked printing device (e.g., including the printing device name 502, the printing device manufacturer and product information 503, and the printing device status information 504), the identification of the corresponding host computer (e.g., the host computer name 505, the host computer IP address 506, the host computer communication interface information 507, and other information 508 of the host computer), and other information of the host computer 508 may be the physical location information of the host computer, etc.

In addition, the server database 500 may also be stored with the device information of a networked printing device. The device information of a network device may include the printing device name 502, the network connection label 501, the printing device manufacturer and product information 503, and the printing device status information 504. The network connection label 501 may indicate the printing device is a networked printing device.

The server database 500 may be divided into two storage portions. One storage portion may store the device information of the non-networked printing device, and the other storage portion may store the device information of the networked printing device. Specific content stored in the storage portions may be referred to previous description. When obtaining device information of the printing device from the network, the network connection label 501 may be obtained from the device information, and the label may be used to distinguish a networked printing device from a non-networked printing device, so that the obtained device information of a printing device may be stored in one of the two storage portions.

Figure 6:
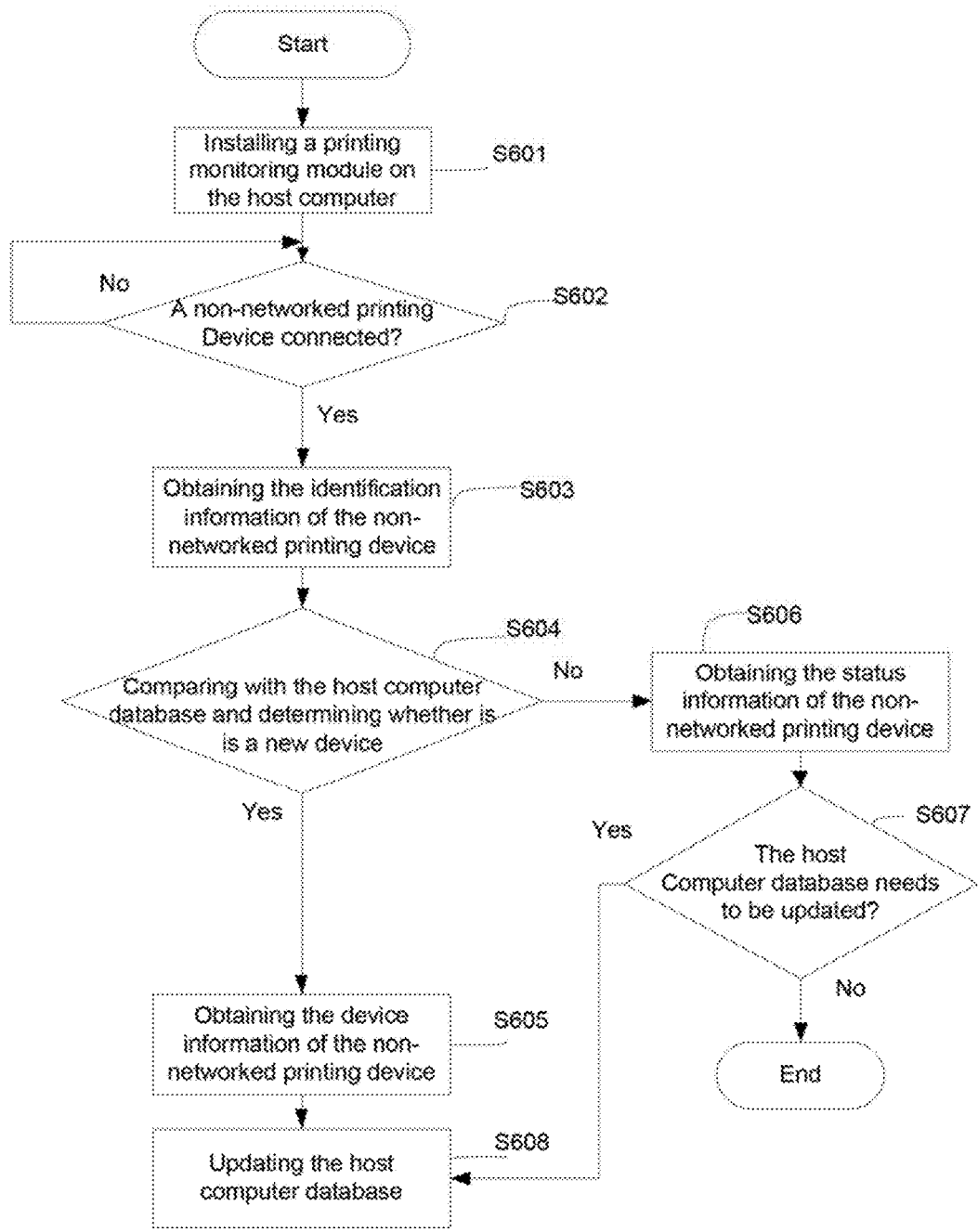
FIG. 6 illustrates an exemplary flow chart of a host computer collecting device information of non-networked printing device consistent with various disclosed embodiments of the present disclosure.

FIG. 6 illustrates how a host computer connected to network W150 obtains and updates the device information of the non-networked printing devices (140 and 141). As shown in FIG. 6, the process may include the following steps.

In step S601, a printing monitoring module 400 may be installed on the host computer 120.

In step S602, the host computer 120 may use the installed printing monitoring module 400 to monitor whether a non-networked printing device (using non-networked printing device 140 as an example for illustration), is connected to the host computer 120.

Specifically, the LAN monitoring unit 405 in the printing monitoring module 400 may be used to monitor whether a non-networked printing device is connected. When detecting a non-networked printing device is connected to the host computer 120, the process may proceed to step S603.

In step S603, the host computer 120 may obtain the identification information of the monitored non-networked printing device 140.

Specifically, when the LAN monitoring unit 405 detects a non-networked printing device 140 is connected the host computer 120, the printing device communication control unit 403 may be used to communicate with the non-networked printing device 140, to obtain the identification information, e.g., the device serial number of the printing device, the printing device manufacturer and product information, etc., of the non-networked printing device 140, and send this information to the LAN monitoring unit 405 to be analyzed, and the process may proceed to step S604.

In step S604, the host computer 120 may determine whether the identification information of the non-networked printing device 140 is locally stored (e.g., in the host computer database 406 or in text files).

Specifically, the LAN monitoring unit 405 may be used to search in the host computer database 406 to determine whether one or more of the device serial number, printing device manufacturer and product information, and other information in the obtained identification information exist, to determine whether the identification information of a non-networked printing device consistent with the obtained identification information of the non-networked printing device 140 was previously stored.

If it is determined the abovementioned identification information is not stored locally, it may be determined the non-networked printing device 140 to be a first-time-connected printing device or a newly-connected printing device, and the process may proceed to step S605; otherwise, it may be determined the non-networked printing device 140 was previously connected to the host computer, and the process may proceed to step S606.

In step S605, the host computer 120 may obtain the device information of the newly-connected non-networked printing device 140, and the process may proceed to step S608. The device information of the non-networked printing device 140 may be, after the host computer 120 sends a request for device information to the non-networked printing device 140, a response to the request for device information provided to the host computer 120 by the non-networked printing device 140. The device information may also be actively sent by the non-networked printing device 140 when the non-networked printing device 140 is connected to the host computer 120.

Specifically, the LAN monitoring unit 405 may monitor the newly-connected non-networked printing device 140. By sending a request command through the printing device communication control unit 403, the LAN monitoring unit 405 may request to obtain the device information of the non-networked printing device 140, such as the printing device name, the printing device manufacturer and product information, and the status information of the printing device. The host computer 120 may, through monitoring whether a non-networked printing device is connected and based on the monitoring result, obtain the device information of the newly-connected non-networked printing device. Thus, when receiving the inquiry request from the printing monitoring server 100, the response time may be greatly shortened. Accordingly, the time delay caused by indirect connection between a non-networked printing device and the printing monitoring server 100 may be largely compensated.

In step S606, the current status information of the non-networked printing device 140 may be obtained.

Because the non-networked printing device 140 was connected to the host computer 120, the device information of the non-networked printing device 140 has been stored in the host computer database 406. Thus, by detecting whether the status information of the non-networked printing device 140 has changed, it may be determined whether the host computer database 406 needs to be updated.

Specifically, the LAN monitoring unit 405 may send a status request command to the non-networked printing device 140 through the printing device communication control unit 403. The non-networked printing device 140 may return the current status information, e.g., the remaining amount of toner/ink, the number of printed pages, and whether an error occurred, based on the command. The LAN monitoring unit 405 may receive the returned result based on the printing device communication control unit 403, and the process may proceed to step S607.

In step S607, it may be determined that the obtained status information of the non-networked printing device 140 is consistent with the status information of the non-networked printing device 140 previously stored in the host computer database 406, and further determine whether the host computer database 406 needs to be updated. Step S607 may be based on the comparison between the obtained status information of the non-networked printing device 140 and the status information of the non-networked printing device 140 stored in the host computer database 406.

Specifically, the LAN monitoring unit 405 may, based on the obtained status information, compare the obtained status information of the non-networked printing device 140 to the status information of the non-networked printing device 140 stored in the host computer database 406. If no difference is detected, it may be determined that the host computer database 406 does not need to be updated; if a difference is detected, it may be determined that the host computer database needs to be updated, and the process may proceed to step S608.

In steps S606 and S607, whether the host computer database 406 needs to be updated may also be determined based on whether the status of the connected printing device has changed.

Specifically, in step S606, the LAN monitoring unit 405 may send a status request command to the connected non-networked printing device 140 through the printing device communication control unit 403, and after receiving the status request command, the non-networked printing device 140 may return corresponding information based on whether its status has changed. If the status of the printing device has changed, the changed status information may be returned. For example, if information of paper jam has updated, only the information of paper jam may be returned; and if the remaining amount of toner has changed, information of the remaining amount of toner can be returned. It should be noted that, for a non-networked printing device that was previously connected to the host computer, only the status information changed since the latest connection may be returned, and the entire status information may not need to be returned. If no status has changed, information of no status change may be returned.

If the result of step S607 is determined to be yes, i.e., the host computer database 406 needs to be updated, the process may proceed to step S608. The host computer 120 may obtain the status information of the connected non-networked printing device 140, update the host computer database 406, and send the obtained the device information of the non-networked printing device 140 to the printing monitoring server 100; otherwise the process may end. The printing monitoring server 100 may, based on the status information contained in the received device information of the non-networked printing device 140 from the host computer 120, update the status information of the non-networked printing device 140 contained in the printing device data stored in the server database 500.

In step S608, the host computer may record the device information obtained in step S605 in the host computer database 406 to update the host computer database 406, or update the changed status information of the non-networked printing device stored in the host computer database 406 according to step S607. Specifically, the LAN monitoring unit 405 may store the obtained device information of the newly-connected non-networked printing device 140, combined with the identification information of the host computer 120, in the host computer database 406, and update the device information in the host computer database 406. For a non-networked printing device that is not newly connected to the host computer, the changed status information may be updated in the host computer database 406.

By performing the above processing as shown in FIG. 6, the host computer 120 may send the device information of the non-networked printing device 140 and the identification information of the host computer to the printing monitoring server 100.

Figure 7:
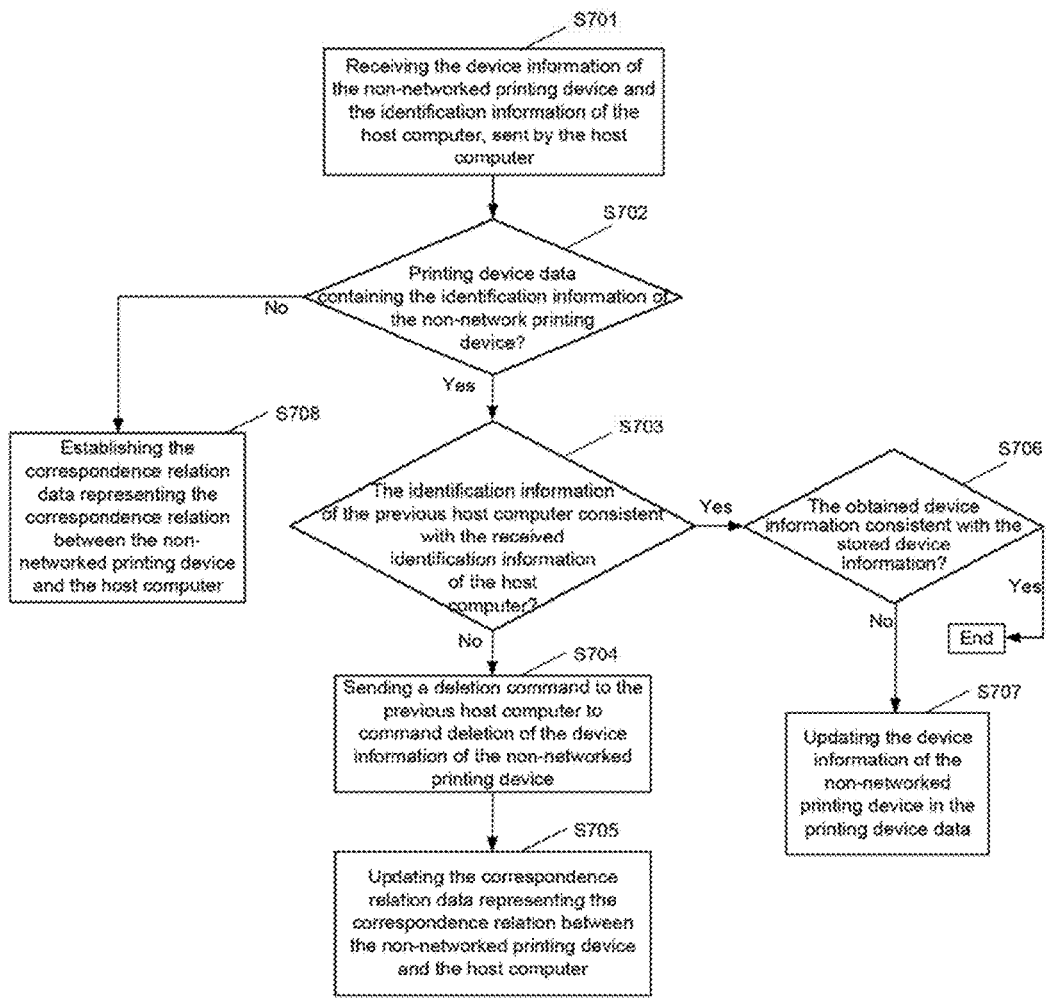
FIG. 7 illustrates an exemplary flow chart of an exemplary method for printing-device monitoring of monitoring connections of non-networked printing devices consistent with various disclosed embodiments of the present disclosure.

FIG. 7 illustrates an exemplary flow chart of the disclosed method for printing-device monitoring to monitor the connection of a non-networked printing device. The process flow of monitoring a non-networked printing device by a printing monitoring server 100 is now described in connection of FIG. 7.

In step S701, the printing monitoring server 100, connected in network W150, may receive the device information of a non-networked printing device (the non-networked printing device 140 is illustrated as an example) and the identification information of the host computer 120, sent by a host computer 120 connected in network W150. The non-networked printing device 140 may be connected to the host computer, and may be connected to network W150 through the host computer 120. The device information of the non-networked printing device 140 may mainly include the identification information and status information of the non-networked printing device.

In step S702, the printing monitoring server 100, based on the printing device data stored in the server database 500 and the device information of the non-networked printing device 140 received from the host computer 120, determine whether the printing device data contains the identification information of the non-networked printing device 140. In one embodiment, the printing device data may be stored in the server database 500.

Specifically, the printing monitoring server 100 may search whether identification information consistent with the identification information of the non-networked printing device 140, in the device information of the non-networked printing device 140, exists in the printing monitoring server 100. If the identification information exists, the determined result may be "yes", i.e., the identification information consistent with the identification information of the non-networked printing device 140 exists in the printing monitoring server 100; otherwise, the determined result may be "no", i.e., the identification information consistent with the identification information of the non-networked printing device 140 does not exist in the printing monitoring server 100. If the determined result is "yes", the process may proceed to step S703; otherwise, the process may proceed to step S708.

In step S703, the printing monitoring server 100 may determine the identification information of the host computer, contained in the printing device data stored in the server database 500 and corresponding to the non-networked printing device 140, to be the identification information of a host computer previously connected to the non-networked printing device 140 (below referred to as the previous host computer), and determine whether the identification information of the previous host computer is consistent with the received identification information of the host computer 120. If it is determined the identification information of the previous host computer is consistent with the received identification information of the host computer 120, the process may proceed to step S706; if it is determined the identification information of the previous host computer is inconsistent with the received identification information of the host computer 120, the process may proceed to step S704.

In step S704, if the identification information of the previous host computer is not consistent with the received identification information of the host computer 120, the printing monitoring server 100 may send a deletion command, for indicating deletion of the device information of the non-networked printing device 140, to the previous host computer.

In step S705, based on the received device information of the non-networked printing device 140 and the identification information of the host computer 120, the correspondence relation data representing the correspondence relation between the non-networked printing device 140 and the host computer 120 may be updated in the printing device data.

In one embodiment, updating the correspondence relation data may specifically be, updating the identification information of the host computer corresponding to the non-networked printing device 140 with the identification information of the host computer 120. The format of the correspondence relation data may be referred to FIG. 5.

If in step S703, the printing monitoring server 100 determines the identification information of the previous host computer is inconsistent with the received identification information of the host computer 120, the order to execute steps S704 and S705 may be flexible.

If the identification information of the previous host computer is not consistent with the received identification information of the host computer 120, it may be that the non-networked printing device 140 has been connected to other host computers (also referred to as previous host computers), and has been disconnected from the previous host computer and moved to be connected to the current host computer 120. Accordingly, the printing monitoring server 100 may send a deletion command, for indicating deletion of the device information of the non-networked printing device 140, to the previous host computer.

Thus, the previous host computer may not store the device information of the non-networked printing device 140, and the printing monitoring server 100 may also update the information of the host computer corresponding to the non-networked printing device 140. Accordingly, technical problems in the conventional technology such as disorganized storage of the device information of the non-networked printing device 140, and failure to accurately monitor the non-networked printing devices that have changed connection to host computers, may be avoided.

Thus, the printing monitoring server 100 may track the changes of host computer connected to the non-networked printing device any time. For the host computer, each time a non-networked printing device is newly connected to the network, the host computer may notify the printing monitoring server 100.

If the currently connected non-networked printing device is being connected to a new host computer different from the previous host computer, according to one embodiment, the new host computer may send information reflecting the change as feedback to the printing monitoring server 100, and the printing monitoring server 100 may notify the previous host computer that the non-networked printing device has been moved to be connected to another host computer. Thus, technical problems of failure to accurately monitor the non-networked printing devices, which have been moved and have changed connection to another host computer, may be well solved.

Specifically, the managing module in the printing monitoring server 100 may first send a deletion command to the server network communication unit 401 in the previous host computer. The LAN monitoring unit 405 of the previous host computer may, according to the deletion command, delete the device information of the non-networked printing device 140 stored in the host computer database 406.

In step S706, if it is determined that the identification information of the host computer previously stored in the server database 500 is consistent with the received identification information of the host computer 120, it may indicate the currently-connected non-networked printing device 140 has been registered in the printing monitoring server 100. Thus, in step S706, it may be further determined whether the received identification information of the printing device 140 is consistent with the device information of the non-networked printing device 140 stored in the printing monitoring server 100. Specifically, the managing module may determine, e.g., by comparison, whether the received device information is consistent with the corresponding device information stored in the server database 500. If it is determined the received device information is inconsistent with the corresponding device information stored in the server database 500, the process may proceed to step S707; if it is determined the received device information is consistent with the corresponding device information stored in the server database 500, it may be determined the currently received device information of the non-networked printing device 140 has undergone no change, and may be the same as the device information stored in the server database 500. Thus, update to the device information of the non-networked printing device 140, contained in the printing device data stored, may be omitted and the process may end.

In step S707, based on the received device information of the non-networked printing device 140, the device information of the non-networked printing device 140 contained in the printing device data in the printing monitoring server 100 may be updated.

In step S708, because it has been determined that the printing device data does not contain the identification information of the non-networked printing device 140, in this step, the printing monitoring server 100 may add correspondence relation data, in the printing device data (implemented through the server database 500 in one embodiment) representing the correspondence relation between the non-networked printing device 140 and the host computer 120, based on the received device information of the non-networked printing device 140 and the identification information of the host computer 120.

Figure 8:
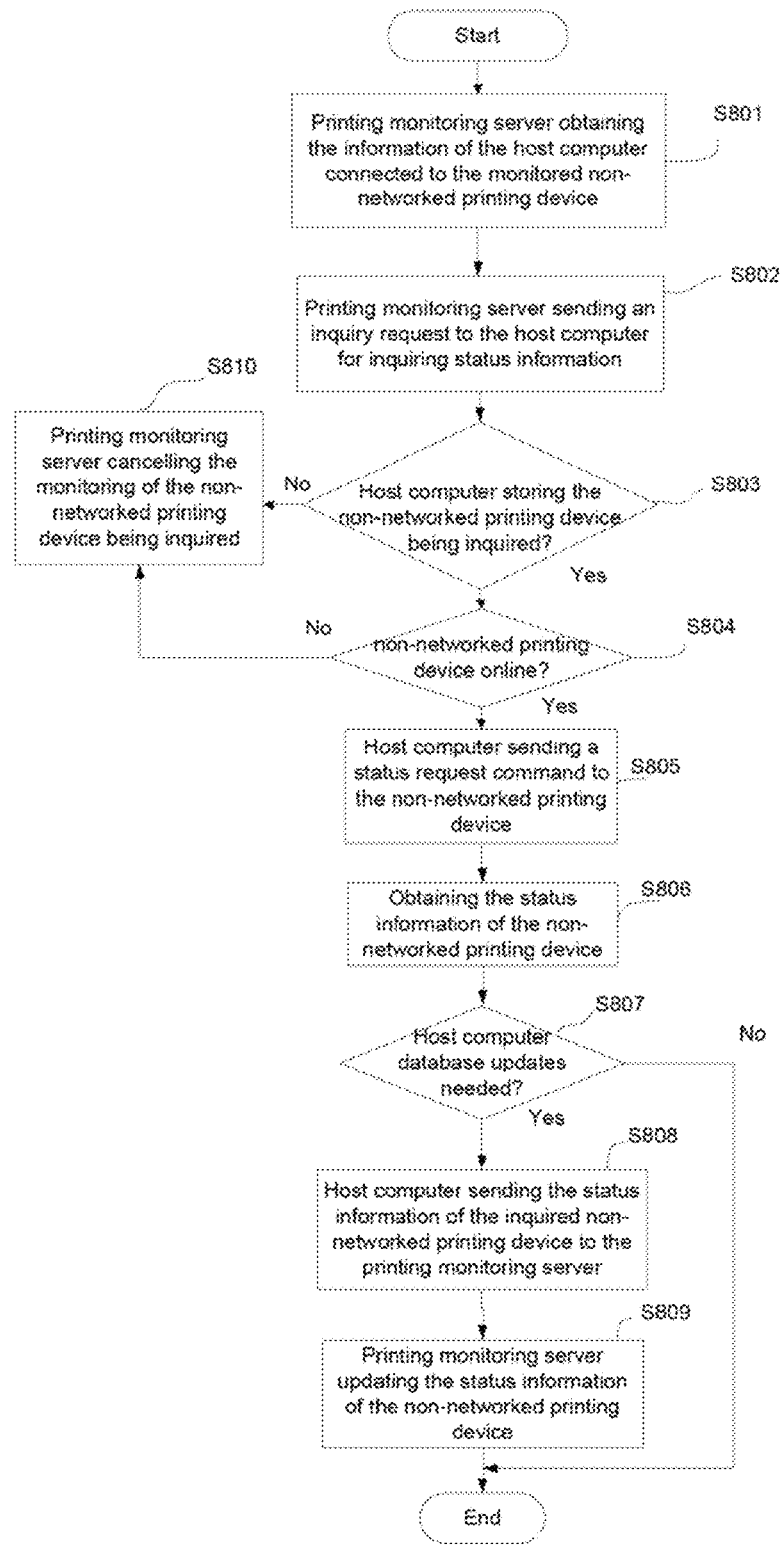
FIG. 8 illustrates an exemplary flow chart of active monitoring of non-networked printing devices consistent with various disclosed embodiments of the present disclosure.

FIG. 8 illustrates an exemplary process flow of active monitoring of a non-networked printing device according to the embodiments of the present disclosure.

To better monitoring each non-networked printing device, the printing monitoring server 100 may, on a regular basis or on an irregular basis, send an inquiry request for inquiring the status information of the non-networked printing devices to each host computer, based on the identification information of the non-networked printing devices stored in the server database 500 (printing device data) and identification information of the corresponding host computers. Details of the process may be illustrated in steps S801 and S802.

The printing monitoring server 100, by parsing the response message sent by host computers in response to the inquiry quest, may ensure the printing device data stored by the printing monitoring server 100 can more timely and accurately reflect the connection status and usage condition of each non-networked printing device. Thus, similarly to the monitoring of networked printing devices, the monitoring of the non-networked printing devices may be maximized.

In step S801, the printing monitoring server 100 may obtain the host computer information connected to each non-networked printing device stored in the printing device data on a regular basis or on an irregular basis.

Specifically, when the printing monitoring server 100 is about to obtain the status information of the non-networked printing devices, the managing module of the printing monitoring server 100 may obtain the information, e.g., the host computer names 505, the host computer IP addresses 506, of the host computers connected to each non-networked printing device from the server database 500 connected to the printing monitoring server 100 or arranged in the printing monitoring server 100. The process may proceed to step S802.

In step S802, each time after obtaining the host computer information connected to each non-networked printing device stored in the printing device data, the printing monitoring server 100 may send an inquiry request, for inquiring the status information of the non-networked printing device, to the host computer corresponding to each piece of the obtained host computer information.

Specifically, the managing module of the printing monitoring server 100 may, based on the obtained host computer information (IP addresses), send an inquiry request to the server network communication units 401 of the host computers through network W150. SNMP may mainly be used for sending the inquiry request. The inquiry request may include the identification information, e.g., the printing device serial number, the manufacture of a printing device, and/or product information, etc., of the non-networked printing devices that need to be monitored.

Then, a host computer that receives the inquiry request may respectively determine whether the host computer is connected to a non-networked printing device in the received inquiry request. If determined to be not connected, the host computer may send a response, reflecting not being connected to a non-networked printing device specified in the inquiry request, to the printing monitoring server 100. Details may be illustrated through steps S803-S809.

In step S803, a host computer may, based on the inquiry request sent by the printing monitoring server, determine whether the host computer database 406 of the host computer stores the information of the non-networked printing device being inquired, specified in the inquiry request.

Specifically, the LAN monitoring unit 405 may, perform a match process between the received identification information of a non-networked printing device in the inquiry request with the identification information of the non-networked printing device stored in the host computer database 406. If a match can be found, it may be determined that the host computer was previously connected to the non-networked printing device corresponding to the identification information contained in the inquiry request, and the process may proceed to step S804. If no match can be found, it may be determined that the current host computer has not been connected to the non-networked printing device corresponding to the identification information contained in the inquiry request, and the process may proceed to step S810.

In step S804, a host computer may, based on the online tagging of a non-networked printing device stored by the host computer, determine whether the host computer is connected to a non-networked printing device specified in the received inquiry request.

Specifically, based on the printing device interface information and host computer interface information contained in the device information of the non-networked printing device stored in the host computer database 406, the LAN monitoring unit 405 may detect whether the host computer is connected to the non-networked printing device. If the host computer is not connected to the non-networked printing device, it may be determined the monitored non-networked printing device is not online, and the step may proceed to step S810. If the host computer is connected to the non-networked printing device and the non-networked printing device is at power-on state, the process may proceed to step S805. Because the host computer stores the online tagging of the non-networked printing device in advance, the response speed of the host computer to the printing monitoring server 100 may be increased.

In step S805, the host computer may send a status request command to the non-networked printing device.

Specifically, the LAN monitoring unit 405 may send a status request command to the non-networked printing device connected to the host computer, through the printing device communication control unit 403, to obtain the status of the non-networked printing device, and the process may proceed to step S806.

In addition, if the host computer is connected to the non-networked printing device, and the non-networked printing device is in power-off state, the process may proceed to step S810.

In step S806, after the host computer sends a status request command to the non-networked printing device, the host computer may obtain the status information returned by the non-networked printing device.

Specifically, the non-networked printing device may, based on the received status request command, return the number of printed pages, the remaining amount of toner/ink, the error condition, and so on, as the status information that reflects the current status of the non-networked printing device, to the LAN monitoring unit 405, and the status may proceed to step S807.

In step S807, the host computer may, based on the received status information of the non-networked printing device, determine whether the host computer database needs to be updated.

Specifically, the LAN monitoring unit 405 may parse the returned status information and compare the returned status information with the original printing device status information of the corresponding non-networked printing device stored in the host computer database 406. If changes to the original printing device status information are found, the process may proceed to step S808. If no changes to the original printing device status information are found, it may indicate that the current status of the non-networked printing device connected to the host computer has not undergone any change, and the host computer database 406 and the server database 500 may not need to be updated. The process may end.

In step S806, the non-networked printing device may also only return the changed status information to the host computer. When the host computer receives the changed status information, in step S807, it may be determined the host computer database needs to be changed. Otherwise, the result determined in step S807 may be no updates is needed.

In step S808, the host computer may send the status information of the non-networked printing device being inquired, to the printing monitoring server 100.

Specifically, the LAN monitoring unit 405 may convert the changed status information, of the non-networked printing device, to the recognizable to the printing monitoring server 100 through the command parsing unit 404, and may send the converted status information, as feedback, of the non-networked printing device to the printing monitoring server 100, through the server network communication unit 401. The process may proceed to step S809.

In step S809, the printing monitoring server 100 may, based on the received status information of the non-networked printing device, update the server database 500.

Specifically, the managing module of the printing monitoring server 100 may, based on the received status information of the non-networked printing device, update the status information of the corresponding non-networked printing device stored in the server database 500.

For example, if the number of printed pages has changed, only the number of printed pages may need to be changed; and if the paper jam information has changed, only the paper jam information may need to be changed.

In step S810, the monitoring of the non-networked printing device being inquired may be cancelled.

Specifically, through the server network communication unit 401, the LAN monitoring unit 405 may send a response reflecting the disconnection from the non-networked printing device specified in the inquiry request, to the printing monitoring server 100, to command the printing monitoring server to cancel the monitoring of the non-networked printing device. The monitoring may end.

In the embodiments of the present disclosure, after the server network communication unit 401 of the printing monitoring module 400 in the host computer receives an inquiry request, the server network communication unit 401 may forward the inquiry request to the command parsing unit 404 in the printing monitoring module 400. The command parsing unit 404 may convert the inquiry command sent by the printing monitoring server 100 to data recognizable to the non-networked printing device, and send the data to the LAN monitoring unit 405. The LAN monitoring unit 405 may directly send the converted inquiry request to the non-networked printing device through the printing device communication control unit 403. The non-networked printing device may return corresponding status information to the LAN monitoring unit 405, and the LAN monitoring unit 405 may send the returned status information to the printing monitoring server 100 according to network monitoring protocols. The inquiry request allocated by the printing monitoring server 100 may be sent to the non-networked printing device through conversion.

Based on the obtained status information, the printing monitoring server 100 may display the model of the current non-networked printing device, the module of the connected host computer, the IP address, the physical address of the host computer, and current status information through the user interface (UI) of the managing module. The printing monitoring server 100 may also display the information of the non-networked printing device in the form of webpages through a browser. Thus, the manager or the maintenance staff may timely acknowledge the status information of the current non-networked printing device.

If it is found that the non-networked printing device prints frequently and the remaining amount of toner/ink is lower than a preset amount, orders for purchasing toner/ink may be made on the printing monitoring server 100.

In addition, the printing monitoring server 100 not only can monitor and manage the device information of a non-networked printing device, the printing monitoring server 100 may configure the non-networked printing device at the same time. The printing monitoring server 100 may mainly obtain the device information of the non-networked printing device from the server database 500 through the UI of the managing module or through webpages, and may perform parameter configuration on the non-networked printing device.

For example, the notification methods, e.g., types of status to be notified, notification methods such as emails, destinations of the notifications, and so on, of the printing status information may be configured. The image-forming conditions, e.g., printing gradation, printing colors, parameters of scanning and copying, idle/sleep time, of the printing device, may also be configured. Meanwhile, the monitoring condition of the net-work printing device, the frequency of the monitoring, and the types of status of the monitoring, may also be configured.

By applying the above configuration, the printing monitoring server 100 may inquire, at a set frequency, the host computers connected to the non-networked printing devices by turns to obtain the status information of the non-networked printing devices. Apparently, a host computer may also be configured to automatically notify the printing monitoring server 100 when the connected non-networked printing device undergoes updates.

The parameters may be configured through the managing module sending a configuration command to the host computer connected to the selected non-networked printing device. After the server network communication unit 401 of the host computer receives the configuration command, the command parsing unit 404 may convert the configuration command to data recognizable to the non-networked printing device. The LAN monitoring unit 405 may send the converted configuration command to the selected non-networked printing device through the printing device communication control unit 403. Thus, the non-networked printing device may be remotely configured through network W150.

It should be noted that, configuring the host computer database in a host computer may be optional. When the host computer database is not configured, in the abovementioned step S803, whether the host computer database stores the information of the non-networked printing device specified in the inquiry command may not be determined. Instead, the host computer may directly detect whether the host computer is connected to the non-networked printing device. If the host computer is connected to the non-networked printing device, the process may directly proceed to step S805 or step S804. Otherwise, the process may proceed to step S810.

In some embodiments, the command parsing unit 404 in the printing monitoring module 400 of a host computer may specifically be an email processing unit. In one embodiment, the monitoring of a non-networked printing device may be implemented through emails.

When a host computer is connected to a new non-networked printing device, the device information obtained by the LAN monitoring unit 405 and the identification of the host computer may be packaged in email format by the email processing unit in the printing monitoring module 400. The email may be sent to the managing module of the printing monitoring server 100 through the server network communication unit 401 according to simple mail transfer protocol (SMTP), so that the connected non-networked printing device may be registered in the server database 500 or the correspondence relation data of the non-networked printing device in the server database 500 may be updated. Meanwhile, when the managing module of the printing monitoring server 100 is monitoring the non-networked printing device, the managing module may send an email to the host computer connected to the non-networked printing device. The email may contain an inquiry request command. The email processing unit of the host computer may parse the email received by the server network communication unit 401, and convert the inquiry request to a status request command recognizable to the non-networked printing device and send the status request command to the LAN monitoring unit 405. The LAN monitoring unit 405 may send the status request command to the non-networked printing device through the printing device communication control unit 403, and receive the result returned by the non-networked printing device. The email processing unit may convert the returned result to email format, and the converted returned result may be send to the printing monitoring server 100 through the server network communication unit 401.

Figure 9:
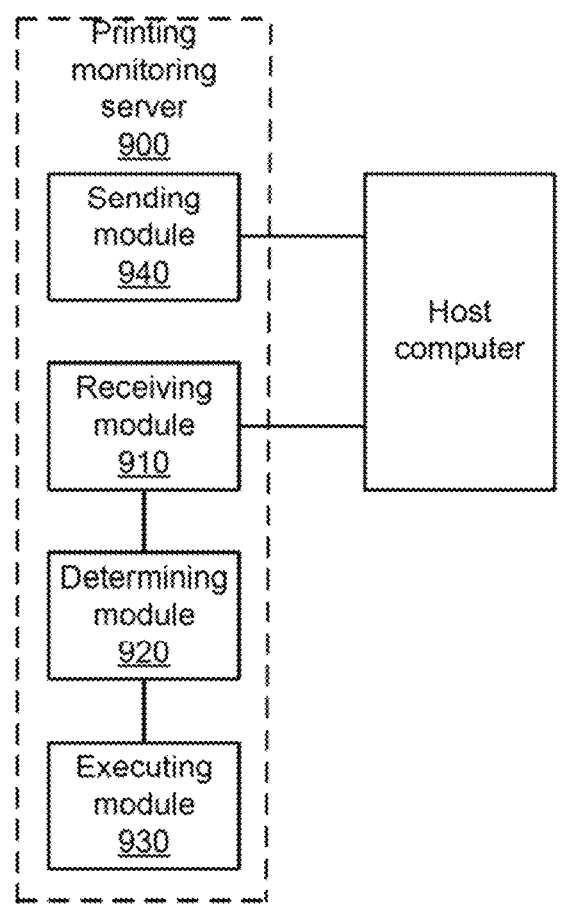
FIG. 9 illustrates an exemplary structure of a printing monitoring server consistent with various disclosed embodiments of the present disclosure.

In some embodiments, as shown in FIG. 9, the printing monitoring server 900, may be connected to network W150. The printing monitoring server 900 may mainly include a receiving module 910, a determining module 920, and an executing module 930.

The receiving module 910 may receive the identification information of the non-networked printing device and the identification information of the host computer, sent by the host computer. The non-networked printing device may be connected to the host computer, and may be connected to network W150 through the host computer. When the host computer is sending the identification information of the non-networked printing device and the identification information of the host computer, the host computer may send the status information of the non-networked printing device at the same time. For example, the host computer may send the identification information and the status information of the non-networked printing device as the device information of the non-networked printing device, to the printing monitoring server 900 together with the identification information of the host computer.

The determining module 920 may be connected to the receiving module 910. When the printing device data, stored locally in the printing monitoring server 900, contain the identification information of a non-networked printing device, it may be that the non-networked printing device was previously connected to the network W150 through a host computer. At this time, the identification information of a host computer, corresponding to the non-networked printing device and stored in the printing device data, may be determined to be the identification information of the previous host computer, so that when the previous host computer is different from the current host computer, the identification information of the host computer connected to the non-networked printing device may be updated.

The executing module 930 may be connected to the determining module 920. When the identification information of the previous host computer is different from the identification information of the current host computer, it may be that the non-networked printing device was connected to network W150 through the previous host computer, and currently the non-networked printing device is connected to network W150 through the new host computer. At this time, based on the identification information of the previous host computer, the previous host computer, stored with the identification information of the non-networked printing device, may be commanded to delete the identification information of the non-networked printing device. Thus, the history information of the non-networked printing device being previously connected to network W150 through the previous host computer may be deleted. In addition, based on the identification information of the non-networked printing device and the identification of the host computer, the non-networked printing device may be updated to be corresponding to the host computer in the printing device data. This may indicate that the non-networked printing device is currently being connected to network W150 through the current host computer.

As shown in FIG. 9, the printing monitoring server provided by the present disclosure may further include a sending module 940. The sending module 940 may mainly be used to send inquiry requests to the host computers, to obtain related information of non-networked printing devices connected to network W150 through the host computers. The receiving module 910 may receive the status information obtained from a non-networked printing device and sent by a host computer or a response reflecting disconnection of a host computer from a non-networked printing device. When a non-networked printing device is connected to network W150 through a host computer, the host computer may obtain the status information of the non-networked printing device from the non-networked printing device. If the non-networked printing device is currently disconnected from the host computer and is in offline state (not connected to network W150), the host computer may not be able to inquire the non-networked printing device, and the host computer may send a response to the printing monitoring server reflecting disconnection from the non-networked printing device. The host computer may obtain the status information from the non-networked printing device according to an inquiry request.

In disclosed embodiments, when the receiving module 910 is receiving the identification information of the non-networked printing device and the identification information of the host computer, the receiving module may together receive the status information of the non-networked printing device sent by the host computer. When the host computer detects a non-networked printing device is connected to the host computer, the host computer may obtain the identification information of the non-networked printing device. When the host computer does not locally store the identification information of the non-networked printing device, the host computer may obtain the status information of the non-networked printing device.

In the present disclosure, the receiving module 910 may receive the status information of a non-networked printing device obtained by the host computer. The executing module 930 may update the status information of the non-networked printing device in the printing device data based on the status information of the non-networked printing device obtained by the host computer. When the host computer locally stores the identification information of the non-networked printing device, the host computer may obtain the status information of the non-networked printing device based on the locally-stored identification information of the non-networked printing device. When the locally-stored status information of the non-networked printing device is not consistent with the obtained status information of the non-networked printing device, the host may send the obtained status information of the non-networked printing device to the printing monitoring server.

In the disclosed embodiments, when the locally-stored printing device data does not include the identification of the non-networked printing device, the executing module 930 may add the correspondence relation between the non-networked printing device and the host computer in the printing device data, based on the identification information of the non-networked printing device and the identification information of the host computer.

In the disclosed embodiments, the receiving module 910 may receive the identification information of the non-networked printing device and the identification information of the host computer sent by the host computer through emails.

The non-networked printing device in the present disclosure may be referred to as the printing device not directly connected to networks. However, a non-networked printing device may be connected to a network through a computer, a smart phone, and the like.

In one embodiment, when a non-networked printing device is connected to a host computer, the printing monitoring module 400 of the host computer may determine whether the non-networked printing device is a newly connected device. If the non-networked printing device is a newly connected device, the identification information of the non-networked printing device may be obtained and stored in the host computer database 406, and meanwhile, the identification information of the newly connected non-networked printing device and the identification information of the host computer may be sent to the printing monitoring server 900, and correspondence relation data between the newly connected non-networked printing device and the host computer may be established in the server database 500 of the printing monitoring server 900.

If the correspondence relation data of the newly connected non-networked printing device is already stored in the printing device data, it may be determined whether the identification information of the host computer in the correspondence relation data needs to be updated. If it is determined that an update is needed, it may indicate that the newly connected non-networked printing device is removed from a previous host computer to the current host computer. If the connected non-networked printing device is not a newly connected printing device (e.g., the printing device has been connected to the host computer, but was recently power off and power on again), the host computer may not send the identification information of the connected non-networked printing device and the identification information of the host computer to the printing monitoring server 900. Instead, the host computer may obtain the status information of the connected non-networked printing device.

If the status information has undergone changes, the changed status information may be sent as feedback to the printing monitoring server 900 so that the device information of the connected non-networked printing device contained in the printing device data may be updated. Thus, when a non-networked printing device is connected to a host computer, the host computer may, based on the device information stored in the host computer database 406, determine whether the connected non-networked printing device is a newly connected device. If it is a newly connected device, the host computer may automatically send feedback to the printing monitoring server 900 so that the correspondence relation data between the newly connected device and the host computer may be established or updated in the printing device data. If it is not a newly connected device, the host computer may only send the status information of the non-networked printing device to the printing monitoring server 900 as feedback. In network W150, each time when a non-networked printing device is connected to a host computer, by performing the abovementioned processes, the printing monitoring server 900 may accurately ensure each host computer connected to a non-networked printing device and the information reflecting the changes in the host computer. Further, the control process illustrated in FIG. 8 may be used to accurately monitor each non-networked printing device in real time.

In network W150, a non-networked printing device may be shared by each host computer. For example, if the user of host computer 122 wants to use the non-networked printing device 140, the host computer 122 may obtain the status of the non-networked printing device 140 through the printing monitoring server 900, to select printing options. Specifically, the user may, on the host computer 122, request the status information of the non-networked printing device 140 from the printing monitoring server 900 through the printing monitoring module 400. The printing monitoring server 900 may, based on the request, send a status request command to the host computer 120. The host computer 120 may respond to the command and return corresponding status information. The printing monitoring server 900 may send the status information returned by the host computer 120 to the printing monitoring module 400 of the host computer 122 as feedback. The user may acknowledge the status, e.g., online, and ready to print, of the non-networked printing device 140. Thus, it may be convenient for the user to know the status of the non-networked printing devices on other host computers at any time, and the user may select a printing device to use.

In addition, the user may, through the printing monitoring module 400 of the host computer 122, obtain the status information of each non-networked printing device in network W150. Specifically, the printing monitoring module 400 of the host computer 122 may be used to request the status information of each non-networked printing device in the printing device data from the printing monitoring server 900, and display the status list of each non-networked printing device on the printing monitoring module 400. The user may select an available non-networked printing device to configure printing. Also, the printing monitoring module 400 of the host computer 122 may use the printing monitoring server 900 as relay, to send a status request for the non-networked printing device to the printing monitoring module 400 of other host computer, to obtain the real-time status of the non-networked printing device connected to each host computer in network W150. In addition, in network W150, the host computers, capable of network communication, may obtain the status information of the non-networked printing device connected to one another host computer through the printing monitoring module 400 of each host computer. For example, the printing monitoring module 400 of host computer 122 may send a status request to the printing monitoring module 400 of the host computer 120. The printing monitoring module 400 of the host computer 120 may return the status information of the non-networked printing device stored in the host computer database 406 of the host computer 120 based on the status request.

In the embodiments of the present disclosure, a non-networked printing device capable of being connected to network W150 may mainly include a sending module and a receiving module. The sending module may be configured to, when the non-networked printing device is connected to the host computer, send the identification information of the non-networked printing device to the host computer if the host computer did not previously store the identification information of the non-networked printing device, and send the current status information of the non-networked printing device to the host computer based on the status request command. The receiving module may be configured to, when the non-networked printing device is connected to the host computer, receive the status request command sent by the host computer if the host computer previously stored the identification information of the non-networked printing device.

The sending module may, based on the status request command, send the status information of the non-networked printing device that has changed since the latest connection to the host computer, to the host computer.

The embodiments of the present disclosure further include a printing device monitoring system, including the abovementioned non-networked printing device, the host computer that is capable of connecting the abovementioned non-networked printing device to network W150, and the abovementioned printing monitoring server. The host computer may be connected to the receiving module of the printing monitoring server through network W150.

The printing device monitoring system may be referred to each embodiment previously described in the present disclosure, and is not repeated herein.

Although the embodiments disclosed herein are as described above, the description is merely for the purpose of facilitating understanding of the present invention and is not intended to be limiting of the present invention. It should be understood by those skilled in the art that, various changes in form and details may be made therein without departing from the spirit and scope of the present invention as defined by the appended claims. The patent protection scope is defined by the scope of the appended claims.

What is claimed is:

1. A method for printing-device monitoring by a printing monitoring server connected to a network, comprising:
   receiving, by the printing monitoring server, identification information of a non-networked printing device and identification information of a host computer sent by the host computer, the non-networked printing device being connected to the host computer and being connected to the network through the host computer;
   when locally-stored printing device data contains the identification information of the non-networked printing device, the printing monitoring server determining host-computer identification information corresponding to the non-networked printing device and contained in the printing device data, to be identification information of a previous host computer; and
   when detecting, by the printing monitoring server, that the identification information of the previous host computer is inconsistent with the identification information of the host computer, based on the identification information of the previous host computer, commanding, by the printing monitoring server, the previous host computer stored with the identification information of the non-networked printing device to delete the identification information of the non-networked printing device in response to detecting the identification information of the previous host computer being inconsistent with the identification information of the host computer, and updating, by the printing monitoring server, the non-networked printing device to be corresponding to the host computer in the printing device data based on the identification information of the non-networked printing device and the identification information of the host computer, wherein the identification information of the previous host computer is inconsistent with the identification information of the host computer.

2. The method for printing-device monitoring according to claim 1, further comprising:

sending an inquiry request to the host computer, by the printing monitoring server, and receiving status information obtained from the non-networked printing device, or a response reflecting disconnection from the non-networked printing device, by the host computer, wherein the host computer obtains the status information from the non-networked printing device based on the inquiry request.

3. The method for printing-device monitoring according to claim 1, wherein:

when the printing monitoring server receives the identification information of the non-networked printing device and the identification information of the host computer sent by the host computer, the printing monitoring server also receives the status information of the non-networked printing device sent by the host computer, and when the host computer detects the non-networked printing device is connected, the host computer obtains the identification information of the non-networked printing device; and when the host computer did not locally store the identification information of the non-networked printing device, the host computer obtains the status information of the non-networked printing device.

4. The method for printing-device monitoring according to claim 3, wherein:

the printing monitoring server receives the status information of the non-networked printing device obtained by the host computer, and updates status information of the non-networked printing device in the printing device data based on the status information of the non-networked printing device obtained by the host computer, and when the host computer locally stores the identification information of the non-networked printing device, the host computer obtains the status information of the non-networked printing device based on locally-stored identification information of the non-networked printing device; and when locally-stored status information of the non-networked printing device is inconsistent with obtained status information of the non-networked printing device, the host computer sends the obtained status information of the non-networked printing device to the printing monitoring server.

5. The method for printing-device monitoring according to claim 1, further comprising:

when the printing device data that is locally stored does not include the identification information of the non-networked printing device, adding, by the printing monitoring server, a correspondence relation between the non-networked printing device and the host computer in the printing device data, based on the identification information of the non-networked printing device and the identification information of the host computer.

6. The method for printing-device monitoring according to claim 1, wherein:

the printing monitoring server receives the identification information of the non-networked printing device and the identification information of the host computer sent by the host computer by email.

7. A printing monitoring server, capable of being connected to a network, comprising:

a memory storing instructions; and a processor coupled to the memory and, when executing the instructions, configured to:

receive identification information of a non-networked printing device and identification information of a host computer sent by the host computer, the non-networked printing device being connected to the host computer and being connected to the network through the host computer;

when locally-stored printing device data contains the identification information of the non-networked printing device, determine a host-computer identification information corresponding to the non-networked printing device and contained in the printing device data, to be identification information of a previous host computer; and when the identification information of the previous host computer is inconsistent with the identification information of the host computer, based on the identification information of the previous host computer, command the previous host computer stored with the identification information of the non-networked printing device to delete the identification information of the non-networked printing device in response to detecting the identification information of the previous host computer being inconsistent with the identification information of the host computer, and update the non-networked printing device to be corresponding to the host computer in the printing device data based on the identification information of the non-networked printing device and the identification information of the host computer, wherein the identification information of the previous host computer is inconsistent with the identification information of the host computer.

8. The printing monitoring server according to claim 7, wherein the processor is further configured to:

send an inquiry request to the host computer, wherein:

the processor is configured to receive status information obtained from the non-networked printing device, or a response reflecting disconnection from the non-networked printing device, by the host computer, and the host computer obtains the status information from the non-networked printing device based on the inquiry request.

9. The printing monitoring server according to claim 7, wherein:

when the processor receives the identification information of the non-networked printing device and the identification information of the host computer sent by the host computer, the processor is also configured to receive the status information of the non-networked printing device sent by the host computer, wherein:

when the host computer detects the non-networked printing device is connected, the host computer obtains the identification information of the non-networked printing device; and when the host computer did not locally store the identification information of the non-networked printing device, the host computer obtains the status information of the non-networked printing device.

10. The printing monitoring server according to claim 9, wherein the processor is configured to:

receive the status information of the non-networked printing device obtained by the host computer;

update status information of the non-networked printing device contained in the printing device data based on the status information of the non-networked printing device obtained by the host computer, wherein:

when the host computer locally stores the identification information of the non-networked printing device, the host computer obtains the status information of the non-networked printing device based on locally-stored identification information of the non-networked printing device; and when locally-stored status information of the non-networked printing device is inconsistent with obtained status information of the non-networked printing device, the host computer sends the obtained status information of the non-networked printing device to the printing monitoring server.

11. The printing monitoring server according to claim 7, wherein:

when the printing device data that is locally stored does not include the identification information of the non-networked printing device, the processor is configured to add a correspondence relation between the non-networked printing device and the host computer in the printing device data, based on the identification information of the non-networked printing device and the identification information of the host computer.

12. The printing monitoring server according to claim 7, wherein:

the processor is configured to receive the identification information of the non-networked printing device and the identification information of the host computer sent by the host computer by email.

13. A host computer, capable of being connected to a networking, comprising:

a memory storing instructions; and a processor coupled to the memory and, when executing the instructions, configured to:

facilitate communication between the processor and a printing monitoring server in the network;

facilitate communication between the processor and a non-networked printing device connected to the host computer;

package and convert an execution command sent by the printing monitoring server to a command recognizable to the non-networked printing device and forward the command to the processor, receive a response for the command sent by the non-networked printing device, and send the response to the printing monitoring server after packaging the response;

send the command to the non-networked printing device and send the response to the processor; and receive a deletion command sent by the printing monitoring server in response to detecting, by the printing monitoring server, the identification information of the previous host computer being inconsistent with the identification information of the host computer, and delete locally-stored device information of a non-networked printing device previous connected to the host computer, wherein the printing monitoring server sends the deletion command when the non-networked printing device previous connected to the host computer interacts with the printing monitoring server through another host computer.

14. The host computer according to claim 13, wherein:

the processor is configured to process email.

15. The host computer according to claim 13, wherein:

the processor is configured to monitor the non-networked printing device through the processor, and send status information of the non-networked printing device to the printing monitoring server through the processor.

16. The host computer according to claim 15, wherein:

when the processor detects the non-networked printing device is connected to the host computer, the processor is configured to obtain identification information of the non-networked printing device; when the host computer locally stores the identification information of the non-networked printing device, the processor is configured to obtain the status information of the non-networked printing device based on locally-stored identification information of the non-networked printing device; and when locally-stored status information of the non-networked printing device is inconsistent with obtained status information of the non-networked printing device, the processor is configured to send the obtained status information of the non-networked printing device to the printing monitoring server.

17. The host compute according to claim 16, wherein:

when the host computer did not locally store the identification information of the non-networked printing device, the processor is configured to obtain the status information of the non-networked printing device, and send device information of the non-networked printing device and the identification information of the host computer to the printing monitoring server, wherein the device information includes the status information and the identification information of the non-networked printing device.

18. The host computer according to claim 13, wherein:

when receiving an inquiry request, the processor is configured to send a status request command to the non-networked printing device, and receive status information sent by the non-networked printing device based on the status request command, and send the status information to the printing monitoring server.

* * * * *